United States Patent
Klein

(10) Patent No.: US 9,808,750 B2
(45) Date of Patent: Nov. 7, 2017

(54) FILTER ELEMENT OF A FILTER AND METHOD FOR MANUFACTURING FILTER ELEMENT

(71) Applicant: MANN+HUMMEL GMBH, Ludwigsburg (DE)

(72) Inventor: Martin Klein, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 679 days.

(21) Appl. No.: 14/293,526

(22) Filed: Jun. 2, 2014

(65) Prior Publication Data
US 2014/0353229 A1 Dec. 4, 2014

(30) Foreign Application Priority Data

Jun. 3, 2013 (DE) .......................... 10 2013 009 197

(51) Int. Cl.
*B01D 35/18* (2006.01)
*F02M 37/22* (2006.01)
*F02M 31/125* (2006.01)

(52) U.S. Cl.
CPC ........... *B01D 35/18* (2013.01); *F02M 31/125* (2013.01); *F02M 37/223* (2013.01); *B01D 2201/0407* (2013.01); *B01D 2201/291* (2013.01); *B01D 2201/4084* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 6,063,350 A | * | 5/2000 | Tarabulski | B01D 53/90 423/212 |
| 6,328,883 B1 | * | 12/2001 | Jensen | B01D 27/00 123/196 A |
| 7,238,056 B2 | * | 7/2007 | McCoy | H01R 24/28 439/660 |
| 7,481,926 B2 | * | 1/2009 | Dworatzek | B01D 29/21 210/232 |
| 8,034,240 B2 | * | 10/2011 | Reiland | B01D 27/08 210/299 |
| 8,038,872 B2 | * | 10/2011 | Jokschas | B01D 27/08 210/184 |

(Continued)

FOREIGN PATENT DOCUMENTS

DE 202007010602 U1 12/2008

*Primary Examiner* — Robert Popovics
(74) *Attorney, Agent, or Firm* — James Hasselbeck

(57) ABSTRACT

A filter element (10) of a filter for fluid, particularly fuel, oil, water, urea solution or air, particularly of a combustion engine, particularly of an automobile, and a method for manufacturing same are described. The filter element (10) comprises a filter medium (14) structured as a filter medium hollow body (12) and closed circumferentially at least with respect to an element axis (16). The filter medium (14) is enclosed at least partially circumferentially and at least partially axially by an electrical heating jacket (26). The filter medium (14) has, on at least one front side, an end member (32) that is connected tightly at least to the filter medium (14). After insertion of the filter medium hollow body (12) into the heating jacket (26), the front side of the filter medium hollow body (12) is provided with an end member (32).

11 Claims, 3 Drawing Sheets

(56) References Cited

U.S. PATENT DOCUMENTS

| | | | | |
|---|---|---|---|---|
| 8,231,779 B2* | 7/2012 | Jokschas | B01D 27/08 123/557 |
| 8,268,170 B2* | 9/2012 | Core | B01D 29/21 210/232 |
| 8,282,819 B2* | 10/2012 | Parra Navarrete | B01D 35/18 210/149 |
| 8,356,716 B1* | 1/2013 | Kruckenberg | B01D 35/30 210/235 |
| 8,413,818 B1* | 4/2013 | Kruckenberg | B01D 35/30 210/235 |
| 8,580,109 B2* | 11/2013 | Kruckenberg | B01D 35/30 210/232 |
| 8,591,736 B2* | 11/2013 | Kruckenberg | B01D 35/30 210/232 |
| 8,641,896 B2* | 2/2014 | Remacha | B01D 35/18 210/184 |
| 8,845,896 B2* | 9/2014 | Kruckenberg | B01D 35/30 210/232 |
| 8,950,052 B2* | 2/2015 | Kruckenberg | B01D 35/30 210/232 |
| 9,080,537 B2* | 7/2015 | Choi | F02M 37/106 |
| 9,533,243 B2* | 1/2017 | Kruckenberg | B01D 35/30 |
| 2006/0219621 A1* | 10/2006 | Dworatzek | B01D 29/21 210/235 |
| 2006/0249499 A1* | 11/2006 | Winkler | B60H 1/00464 219/202 |
| 2008/0197064 A1* | 8/2008 | Blasco Remacha | B01D 35/18 210/184 |
| 2008/0256937 A1* | 10/2008 | Suzuki | F01N 3/105 60/300 |
| 2010/0200485 A1* | 8/2010 | Parra Navarrete | B01D 35/18 210/184 |
| 2011/0147297 A1* | 6/2011 | Core | B01D 29/21 210/232 |
| 2011/0303543 A1* | 12/2011 | Fritze | B01D 35/06 204/554 |
| 2013/0067718 A1* | 3/2013 | Kruckenberg | B01D 35/30 29/464 |
| 2013/0068670 A1* | 3/2013 | Kruckenberg | B01D 35/30 210/85 |
| 2013/0068672 A1* | 3/2013 | Kruckenberg | B01D 35/30 210/87 |
| 2013/0068681 A1* | 3/2013 | Kruckenberg | B01D 35/30 210/232 |
| 2013/0068682 A1* | 3/2013 | Kruckenberg | C02F 1/003 210/232 |
| 2013/0068683 A1* | 3/2013 | Kruckenberg | B01D 35/30 210/232 |
| 2013/0068684 A1* | 3/2013 | Kruckenberg | B01D 35/30 210/232 |
| 2013/0263941 A1* | 10/2013 | Landes | F01N 3/2066 137/351 |
| 2014/0138292 A1* | 5/2014 | Kruckenberg | B01D 35/30 210/85 |
| 2014/0353229 A1* | 12/2014 | Klein | B01D 35/18 210/184 |
| 2014/0353230 A1* | 12/2014 | Klein | B01D 35/18 210/185 |
| 2014/0374335 A1* | 12/2014 | Kruckenberg | B01D 35/30 210/232 |
| 2015/0114895 A1* | 4/2015 | Kruckenberg | B01D 35/30 210/232 |
| 2015/0343345 A1* | 12/2015 | Ryoo | B01D 35/005 210/86 |
| 2015/0375148 A1* | 12/2015 | Klein | B01D 35/18 210/186 |
| 2016/0059163 A1* | 3/2016 | Kruckenberg | B01D 35/30 210/85 |
| 2016/0067639 A1* | 3/2016 | Shimpi | B01D 46/429 210/85 |
| 2016/0138538 A1* | 5/2016 | Ham | F02M 37/221 210/96.1 |

* cited by examiner

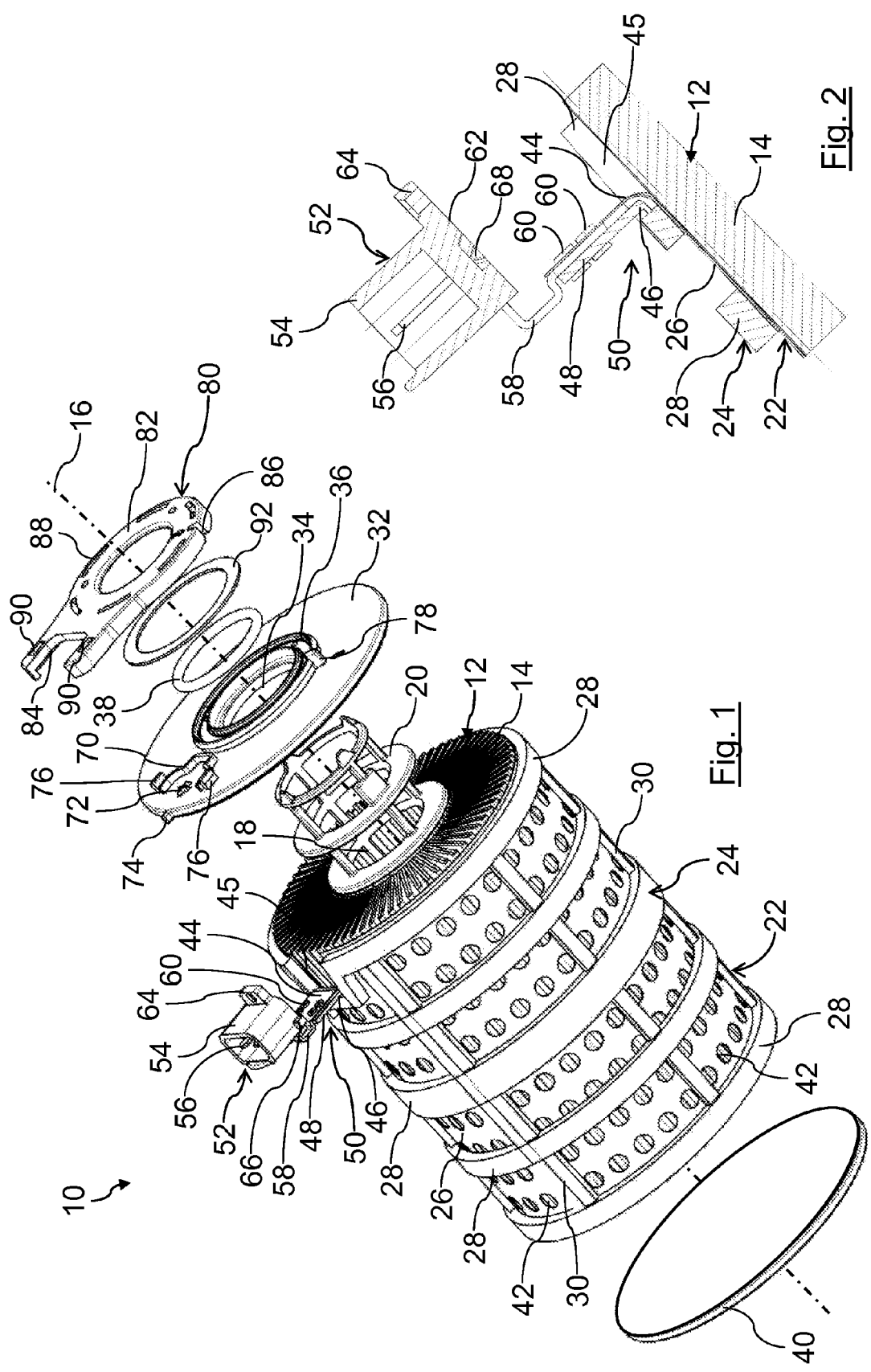

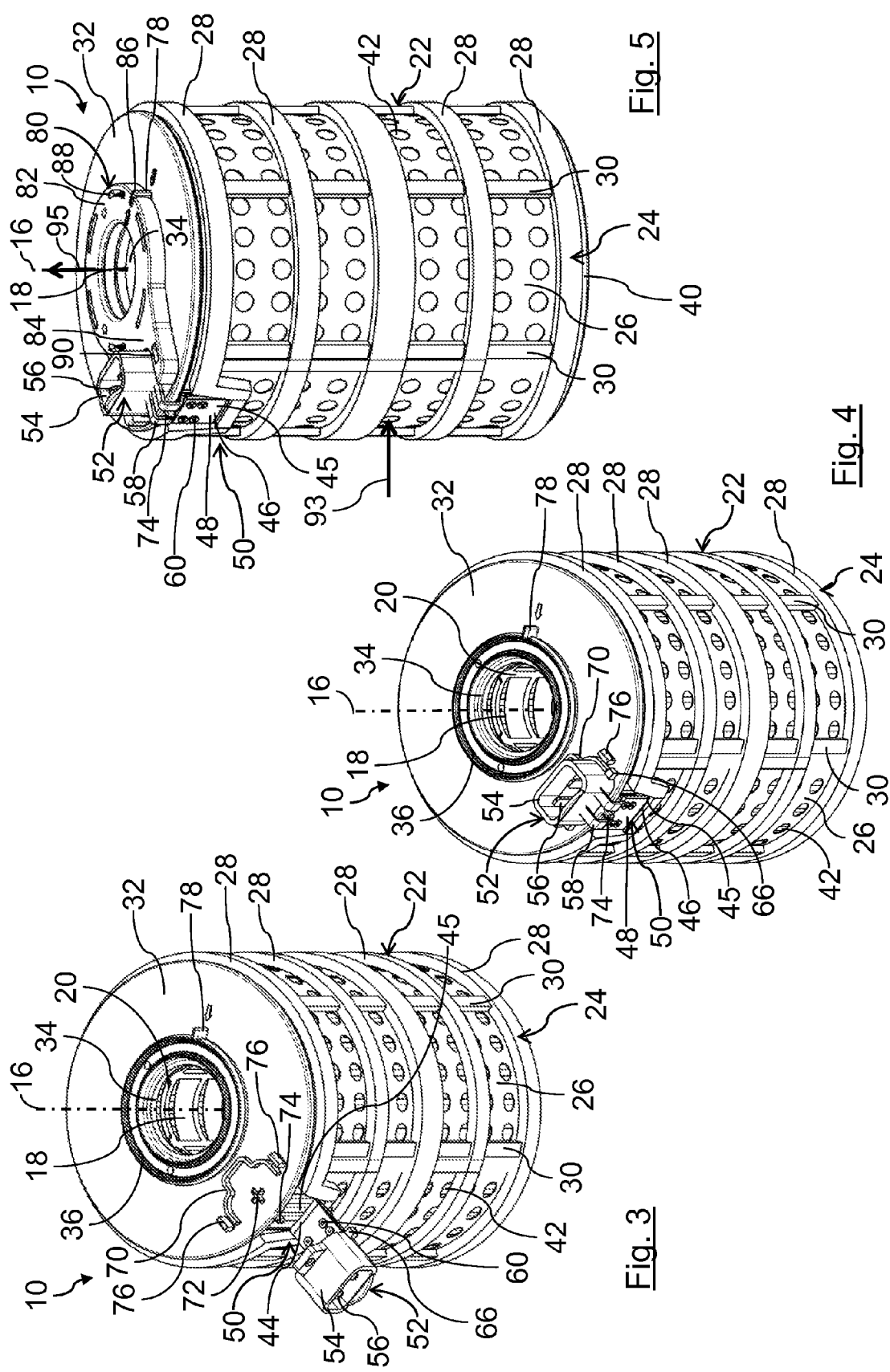

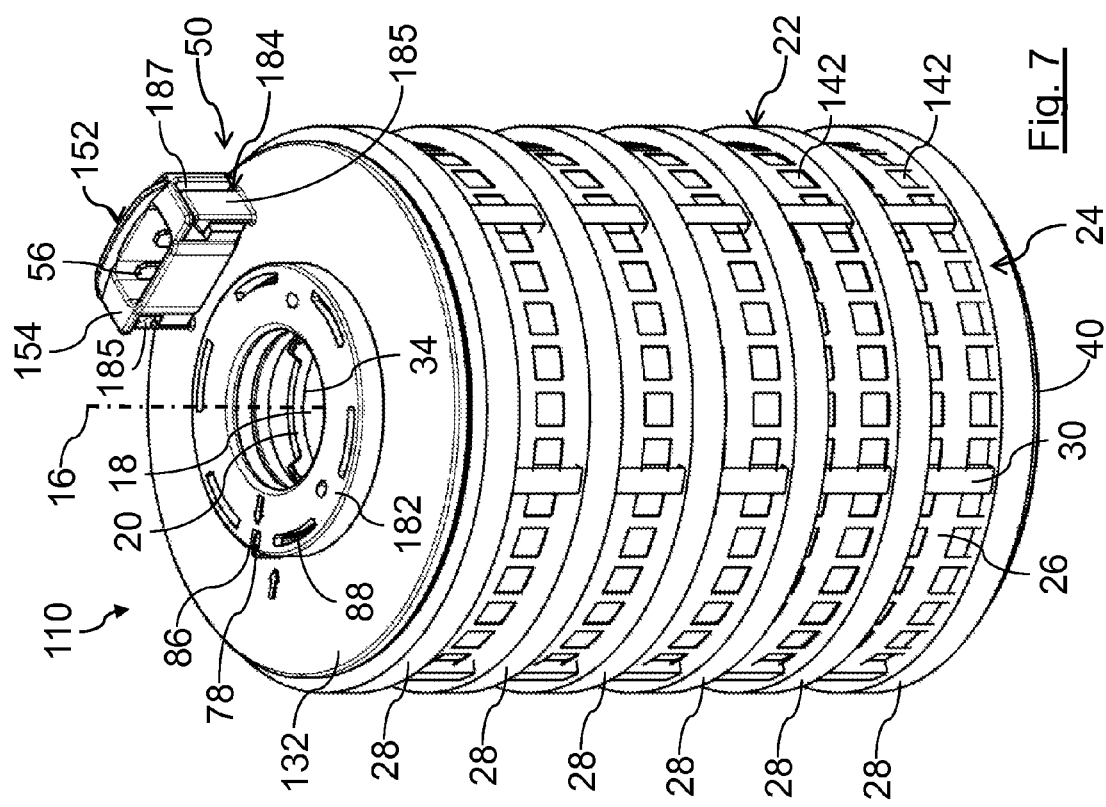
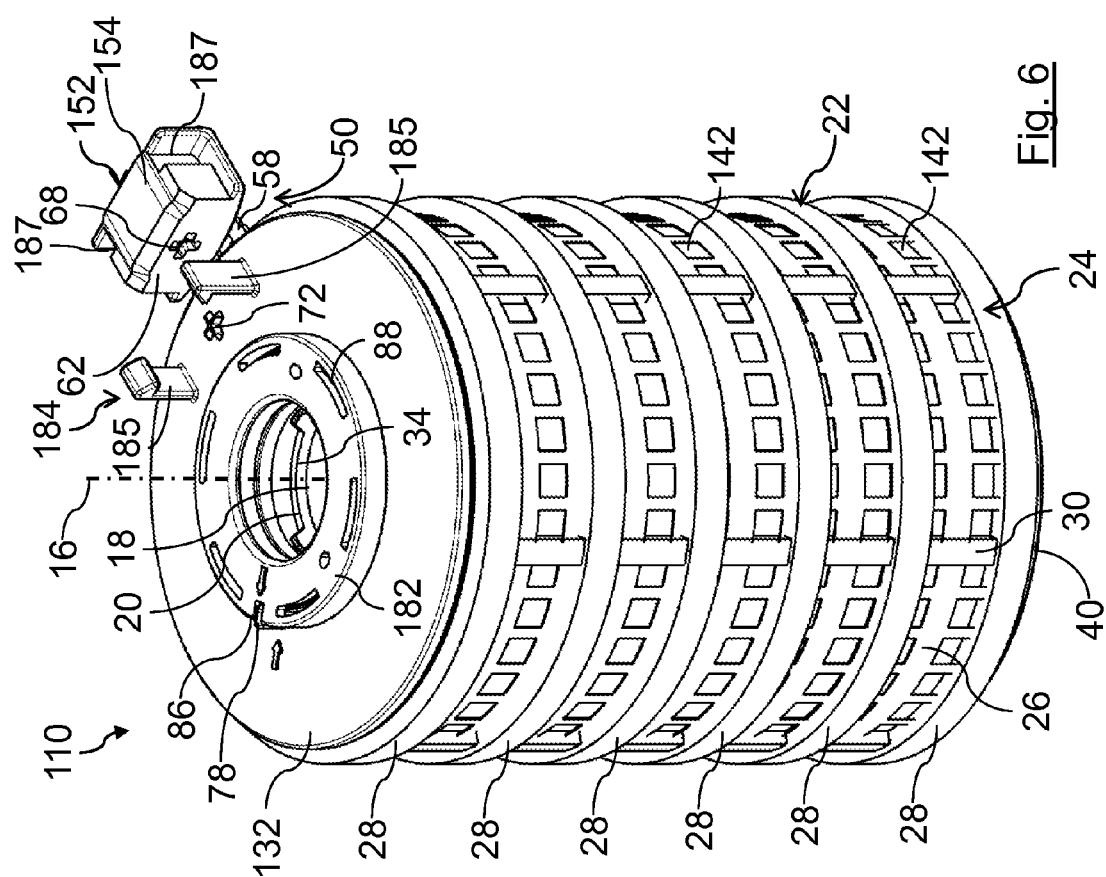

FILTER ELEMENT OF A FILTER AND METHOD FOR MANUFACTURING FILTER ELEMENT

CROSS REFERENCE TO RELATED APPLICATION

This application claims the benefit under 35 USC 119 of German patent application 10 2013 009 197.7 filed Jun. 3, 2013, and which is hereby incorporated by reference in its entirety.

TECHNICAL FIELD

The invention relates to a filter element of a filter for fluid, particularly fuel, oil, water, urea solution or air, particularly of a combustion engine, particularly of an automobile, with a filter medium designed as a filter medium hollow body and closed peripherally at least with respect to an element axis, which is enclosed over at least part of its circumference and at least partially axially by an electrical heating jacket and which has an end member on at least one front side that is connected tightly at least to the filter medium.

The invention further relates to a method for manufacturing a filter element, particularly a filter element according to the invention, of a filter for fluid, particularly fuel, oil, water, urea solution or air, particularly of a combustion engine, particularly of an automobile, in which a filter medium is structured into a filter medium hollow body that is closed around its circumference at least with respect to an element axis, in which the filter medium hollow body is inserted with a first front side first into an electrical heating jacket, so that the heating jacket is arranged at least over part of the circumference and at least partially axially around the filter medium hollow body, and the first front side of the filter medium hollow body is subsequently provided with a sealing end member.

BACKGROUND OF THE INVENTION

A filter element of a fuel filter of an automobile for Diesel fuel is known from DE 20 2007 010 602 U1. The filter element comprises a filter body with a filter material. The filter body is substantially cylindrical. A flat heating element is arranged around the filter material in a closed manner. The heating element is connected firmly and non-detachably to the filter body, for which purpose it is attached to an end plate by adhesion, foaming, injection or the like. The heating element comprises an electrical heating wire. Two ends of the heating wire are bent radially inward for an electrical contact. Together with plug pins, a housing injection-molded out of plastic forms an electrical connecting plug.

SUMMARY OF THE INVENTION

An object of the invention is to provide a filter element and a method for manufacturing a filter element of the type mentioned at the outset that can be easily implemented and in which the filter element takes up as little installation space as possible, particularly in the radial direction with respect to the element axis. Moreover, the greatest possible heating efficiency is to be achievable with the heating jacket.

This object is achieved according to the invention by providing the front side of the filter medium hollow body with the end member after insertion of the filter medium hollow body into the heating jacket.

According to the invention, the electrical connecting element is first arranged radially in a preassembly position on the outside of the filter element before the assembly of the filter element. In this way, the connecting element leaves the front sides of the heating jacket and of the filter medium hollow body free, so that they are freely accessible. The filter medium hollow body can thus be plugged in the axial direction with respect to the element axis into a space enclosed over at least part of its circumference by the heating jacket before connection to the at least one end member. The heating jacket can advantageously be embodied as a hollow body. Advantageously, the heating jacket can be closed circumferentially. Alternatively, the heating jacket can be open on at least one circumferential side. The heating jacket can advantageously have the same axial elongation overall as the filter medium hollow body. In this way, it can cover the filter medium hollow body over its entire axial elongation. Alternatively, the heating jacket can also extend only partially axially, which is to say over a portion of the axial elongation of the filter medium hollow body. Advantageously, a front side of the heating jacket can rest against an end member that is located on the front side with the connecting element, or it can be located at least in the vicinity, so that an electrical connection to the connecting element can easily be implemented there. Alternatively, both front sides of the heating jacket can each be arranged at an axial distance from the front sides of the filter medium hollow body.

After mounting in the heating jacket, the filter medium can advantageously extend outwardly. Advantageously, the heating jacket can rest against the radially outer circumferential side of the filter medium. The heating jacket and/or the filter medium hollow body can then be connected to the at least one end member. The heating jacket and/or the filter medium hollow body can be connected to the at least one end member by means of adhesion, foaming, injection or with the aid of mechanical connecting elements, particularly clamps or catch mechanisms.

Advantageously, the heating jacket can have a heating foil, a heating fabric or a nonwoven heating medium. The heating jacket can also have a knitted or crocheted fabric or a textile of another type. The electrical connecting element can be connected to corresponding heating conductors, particularly heating webs, heating layers or heating threads, of the heating jacket, particularly through riveting, soldering, binding or an electrical connection of another kind.

With the heating jacket, fluid, which can preferably flow from radially outside to radially inside through the filter medium, can be heated before flowing through the filter medium. In this way, the flowability of the fluid can be improved, so that pressure loss between an inflow side, which is to say a raw side, and an outflow side, which is to say a clean side, of the filter medium can be reduced.

Advantageously, the electrical connecting element can be firmly connected in the final assembly position to the at least one end member. Advantageously, the connecting element can be connected to the end member in a positive and/or nonpositive manner, particularly snapped, locked, clamped, welded or adhered.

Advantageously, the filter medium hollow body can have approximately the shape of a hollow cylinder. The filter medium hollow body can also taper conically in the axial direction. The filter medium hollow body can have a round, oval, angular or other cross section. Advantageously, the filter element can be a round filter element or a conical-oval round filtered element. With a round filter element, the filter medium hollow body can be implemented as a round hollow cylinder.

The filter medium can advantageously be folded in the shape of a star and closed circumferentially. A high packing density can be achieved through star-folding, thus improving the ratio of the active surface area for filtering to the required installation space. Instead of the shape of a star, the filter medium can also have a wave-shaped profile in the circumferential direction. Instead, the filter medium can also be flat and circumferentially closed. In particular, the filter medium can be wound.

Advantageously, the at least one end member can be an end plate. Advantageously, the end plate can have a central outlet to an interior space of the filter medium hollow body through which fluid can emerge from the interior space of the filter medium hollow body or get into it.

In an advantageous embodiment, the heating jacket can be connected to an electrical connecting element that can be connected to electrical lines for supplying the electrical heating jacket, and the electrical connecting element can be attached by means of a swivel connection to the heating jacket by means of which the connecting element, upon assembly of the filter element, can be swiveled from a preassembly position circumferentially on the outside of the filter element into a final assembly position on the front side of the filter element.

After the at least one end member is put in place, the electrical connecting element can be swiveled by means of the swivel connection from the preassembly position into the final assembly position on the front side of the filter element. In this way, the installation space of the filter element can be reduced in the radial direction. The connection of the corresponding electrical lines for supplying the electrical heating jacket to the electrical connecting element can be achieved more easily on the front side of the filter element than on the circumferential side.

Advantageously, the swivel connection can have a kind of hinge, particularly a living hinge. With the swivel connection, the electrical connecting element can advantageously be arranged on a frame part or support part of the filter element and/or of a heating cage, particularly of a supporting hollow body. Advantageously, the swivel connection can be integrally connected to the frame part or support part. Advantageously, the swivel connection and the frame part or support part can be made of a plastic. A bendable swivel connection, particularly a living hinge, can be easily made from plastic. A living hinge can have a simple construction and be easily implemented. In a living hinge, no separate parts are required. Instead of being connected in a swiveling manner via the swivel connection to the frame part or support part, the connecting element can also be merely connected in a swiveling manner via appropriate electrical contact tabs to the heating jacket. In this way, a frame for a heating cage can even be omitted. The contact tabs can advantageously be commensurately stable and flexible. The contact tabs can advantageously be connected integrally to the heating jacket. The contact tabs can advantageously consist of sections of the heating jacket that can be bent radially outward or inward by means of corresponding axial cuts or recesses on a corresponding front side of the heating jacket.

Advantageously, the heating jacket can be permeable for the fluid. In this way, fluid can pass through the heating jacket from radially inside to radially outside or vice versa. Advantageously, the heating jacket can have a plurality of flow holes for this purpose through which the fluid can flow. In a textile-like, particularly woven, knitted or crocheted, heating jacket, mesh widths can be large enough for the fluid to flow through. In a nonwoven, particularly fleece-like heating material, pore openings can be commensurately large.

Advantageously, the connecting element can have electrically conducting contact tabs that can be connected mechanically to the swivel connection in order to hold the connecting element on the swivel connection. Alternatively or in addition, a housing of the connecting element can be connected to the swivel connection.

In an advantageous embodiment, a fluid-permeable supporting hollow body can enclose at least the filter medium hollow body circumferentially and at least partially axially, and the electrical connecting element can be attached by means of the swivel connection to the supporting hollow body. With the supporting hollow body, at least the filter medium can be supported on the outside. The supporting hollow body can thus serve as a frame part or support part of the filter element. In addition or alternatively, the supporting hollow body can bear or support the electrical heating jacket. Advantageously, the supporting hollow body can be made of a plastic. Plastic can easily be shaped. The supporting hollow body can thus be implemented with a low weight with respect to its installation space. What is more, plastic can easily be disposed of. Plastic can be physically and chemically resistant to the fluid to be filtered.

Advantageously, a cross-sectional profile on the radially inner circumferential side of the supporting hollow body can correspond to a cross-sectional profile of the filter medium hollow body and/or of the electrical heating jacket. Advantageously, the supporting hollow body can be cylindrical. It can advantageously have a round, oval or angular cross section.

The supporting hollow body can advantageously be constructed in the manner of a skeleton or scaffolding. In this way, it can have outlet openings of sufficient size and number through which the fluid can flow. Pressure loss between the inflow side and the outflow side of the supporting hollow body can thus be reduced. Advantageously, the supporting hollow body can have a plurality of circumferential supports running in the circumferential direction that are spaced apart axially with respect to each other and that can be connected to each other using axial supports that extend in the axial direction.

Advantageously, the connecting element can be easily and stably connected to the supporting hollow body by means of the swivel connection. When viewed radially from the outside, the supporting hollow body can advantageously have a recess in which the swivel connection can be attached and the swivel connection and/or sections of the connecting element can be counter-sunk in the final assembly position. In this way, the installed space of the filter element can be further reduced in the radial direction.

In another advantageous embodiment, the heating jacket can be arranged between a circumferential side of the filter medium hollow body and a circumferential side of the supporting hollow body. In this way, the heating jacket can be arranged so as to be protected toward the outside. The heating jacket can thus be held and supported between the filter medium hollow body and the supporting hollow body. In this way, close contact can be achieved between the heating jacket and the filter medium. The heating efficiency can thus be improved. Advantageously, the heating jacket can be connected to the supporting hollow body. Alternatively, the heating jacket can be embedded at least partially in the supporting hollow body. Alternatively, the heating jacket can be arranged on the radially outside circumferential side of the supporting hollow body.

In another advantageous embodiment, the at least one end member can have a holding device at least for positioning, preferably for holding, the electrical connecting element. In this way, the precision of the positioning of the connecting element can be improved. Advantageously, at least one end member can be a plastic body, particularly a plastic injection-molded body on which raised areas and/or recesses can be embodied that can cooperate with corresponding recesses and/or raised areas of a housing of the connecting element for positioning and/or holding. The holding device can advantageously have a kind of frame that is adapted to a corresponding contour of the housing of the connecting element and can be placed and in/against/on the connecting element. The connecting element and the holding device can also have connecting elements that cooperate with each other, particularly detent elements, which can additionally enable fixation of the connecting element on the at least one end member. The electrical connecting element can be attached by means of the holding device to the at least one end member and by means of the swivel connection to a frame part or support part, optionally the supporting hollow body. The stability of the filter element can thus be further increased.

In another advantageous embodiment, a fixing element can be connected to the at least one end member, which can fix the electrical connecting element to the end member, and have a seal fixing section that can fix a seal around an opening of the end member. Advantageously, the fixing element can be a kind of covering element, particularly a covering cap. Advantageously, the fixing element can be placed onto the end member after the swiveling-in and positioning of the connecting element and after application of the seal, particularly in the axial direction. The fixing element can cover the seal by means of fastening sections of the connecting element corresponding to the element fixing section, and with the seal fixing section. Advantageously, the fixing element can be one piece. It can advantageously be made of plastic. Advantageously, the seal fixing section can be approximately annular. The annular seal fixing section can advantageously have a U-shaped profile that can cooperate with a seal holder for the seal. The element fixing section can be implemented as a laterally protruding section on the seal fixing section. The element fixing section can be fork-like. In this way, it can enclose the electrical connecting element. The fixing element can advantageously have detent elements, particularly detent openings, that can cooperate with corresponding detent elements, particularly detent lugs, on the end member. A stable connection of the fixing element to the end member can thus be implemented.

The technical object is achieved in the inventive manufacturing method.

The advantages and features listed in connection with the filter element according to the invention apply to the inventive method and its advantageous embodiments, and vice versa.

In an advantageous development of the method, an electrical connecting element can be attached to the heating jacket by means of a swivel connection and be swiveled by means of the swivel connection after insertion of the filter medium hollow body into the heating jacket from the preassembly position into a final assembly position on the front side of the filter medium hollow body. Advantageously, the connecting element can only be brought from its preassembly position into its final assembly position after the arrangement of the filter medium hollow body within the heating jacket. In this way, the filter medium hollow body can easily be arranged in an interior space surrounding the heating jacket, even in the axial direction.

Advantageously, the filter medium can be folded in a star shape and formed into a filter medium hollow body that is circumferentially closed and approximately cylindrical. Alternatively, the filter medium can also be flat, particularly wound, and be closed circumferentially. Advantageously, the heating jacket can be formed into an at least partially circumferentially closed and at least partially axial heating jacket hollow body, and the filter medium can then be inserted in the axial direction into the heating jacket hollow body. Alternatively, the heating jacket hollow body can be left open initially on a circumferential side and be arranged from a circumferential side around the filter medium hollow body. Advantageously, the electrical heating jacket can be preassembled with the electrical connecting element. Advantageously, after the arrangement of the filter medium hollow body in the heating jacket hollow body, the at least one end member can be arranged on the front side of the filter medium hollow body and/or of the heating jacket hollow body and connected to the filter medium and/or to the heating jacket. The connection of the at least one end members to the filter medium can advantageously be fluid tight. Advantageously, the at least one end member can be connected to the filter medium and/or to the heating jacket in a positive and/or nonpositive manner, particularly by means of adhesion, welding, clamping or locking. The electrical connecting element can then be swiveled to the at least one end member and arranged in its final assembly position on the front side of the filter element.

In an advantageous development of the method, the electrical connecting element can be attached by means of the swivel connection to a fluid-permeable supporting hollow body, and the filter medium hollow body can be arranged in the supporting hollow body. Advantageously, the connecting element can be premounted on the supporting hollow body by means of the swivel connection. The supporting hollow body can advantageously be implemented as a skeleton- or scaffolding-like frame, which can particularly have a hollow, cylindrical shape. The connecting element can be stably attached to the supporting hollow body. Advantageously, the swivel connection can be integrally connected to the supporting hollow body. The swivel connection can particularly be prefabricated out of plastic integrally with the supporting hollow body. Advantageously, the swivel connection can have a kind of living hinge, which can be easily implemented from plastic.

In another advantageous embodiment of the method, the heating jacket can be arranged on an inner circumferential side of the supporting hollow body. Advantageously, the heating jacket can be arranged in the supporting hollow body before the filter medium hollow body is arranged in the supporting hollow body. The heating jacket can be arranged in a protected manner on the inside of the supporting hollow body. Moreover, the heating jacket can be clamped between the radially inner circumferential side of the supporting hollow body and the radially outer circumferential side of the filter medium. In this way, a close contact can be established between the heating jacket and the filter medium, as a result of which the heating efficiency can be improved.

Alternatively, the heating jacket can also be arranged on an outer circumferential side of the supporting hollow body.

In another advantageous embodiment of the method, the electrical connecting element can be swiveled against/in/on a holding device of the at least one end member. The electrical connecting element can also be put in place, and optionally held, on the end member with the holding device. The stability of the filter element and/or of the connection of the connecting element to the filter medium hollow body can thus be improved.

In another advantageous embodiment of the method, a fixing element can be connected to the at least one end member, the electrical connecting element can be fixed on the end member with a connecting element fixing section, and a previously mounted seal can be fixed around an opening of the end member with a seal fixing section. Advantageously, the connecting element can first be placed on the end member and the seal can be arranged in a corresponding seal groove of the end member. With only one component, both the connecting element and the seal can then be fixed on the end member. In this way, the assembly-related and material expense can be reduced. Furthermore, the stability of the filter element can thus be further improved, since the fixing element covers a larger area of the end member.

BRIEF DESCRIPTION OF THE DRAWINGS

Additional advantages, features and details of the invention follow from the description below, in which exemplary embodiments of the invention are explained in further detail on the basis of the drawing. The person skilled in the art will expediently also consider individually the features disclosed in combination in the drawing, description and claims and combine them into other sensible combinations. Schematic drawing:

FIG. 1 shows an exploded view of a round filter element of a fuel filter according to a first exemplary embodiment, with a heating cage in which an electrical connecting plug can be swiveled by means of a swivel connection from a circumferential-side preassembly position into a front-side final assembly position into a holding device on the end plate;

FIG. 2 shows a detailed section of the round filter element from FIG. 1 in the region of the connecting plug and the swivel connection;

FIG. 3 shows the round filter element from FIG. 1 in a manufacturing phase before the swiveling of the connecting plug into its front-side final assembly position;

FIG. 4 shows the round filter element from FIGS. 1 and 3 in a manufacturing phase after the swiveling of the connecting plug into its front-side final assembly position;

FIG. 5 shows the round filter element from FIGS. 1, 3 and 4 after placement of a fixing element for fixing the connecting plug in its final assembly position and a ring seal on the end plate;

FIG. 6 shows the round filter element according to a second exemplary embodiment, which is similar to the round filter element from FIGS. 1 and 3 to 5, in a manufacturing phase before the swiveling of the connecting plug into its final assembly position, with an alternative holding device for the connecting plug on the end plate; and FIG. 7 shows the round filter element from FIG. 6 after the swiveling of the connecting plug into its final assembly position.

In the figures, same components are designated with the same reference symbols.

DETAILED DESCRIPTION

FIG. 1 shows an exploded view of a filter element 10 of a fuel filter of a combustion engine of an automobile according to a first exemplary embodiment. Preferably, the fuel filter can be arranged in a fuel line for cleaning liquid fuel, such as Diesel fuel. FIGS. 3 to 5 show the filter element 10 in different manufacturing phases.

The filter element 10 is a so-called round filter element, which has an overall approximately hollow cylindrical shape with a round cross section. The filter element 10 is arranged in a filter housing (not otherwise shown) such that it separates an inlet of the filter housing for fuel to be filtered from an outlet. The filter element 10 can be arranged in the filter housing in an exchangeable or fixed manner.

The filter element 10 comprises a filter bellows 12 made of a star-shaped, folded filter medium 14, for example a woven filter medium or a filter paper or another filter medium suited to the filtering of fuel. The filter bellows 12 has the overall shape of a hollow circular cylinder that is coaxial to an element axis 16. Below, when "radial", "axial" or "circumferential" is mentioned, then this refers to the element axis 16 unless otherwise indicated.

A scaffolding-like middle supporting pipe 20 is arranged coaxially in an interior space 18 of the filter bellows 12. The middle supporting pipe 20 is permeable for the fuel in the radial direction. The middle supporting pipe 20 is open on its front sides, so that fuel can travel in the axial direction out of the interior space of the middle supporting pipe 20. A radially inner circumferential side of the filter bellows 12 rests on a radially outer circumferential side of the middle supporting pipe 20, so that the middle supporting pipe 20 supports the filter bellows 12.

Radially on the outside, the filter bellows 12 is enclosed by a coaxial heating cage 22. The heating cage 22 has the overall shape of a hollow circular cylinder. The heating cage 22 has a cage frame 24, radially on the outside, and an electrically operated heating foil 26, radially on the inside. The cage frame 24 is made of plastic. The cage frame 24 has a total of five circumferential supports 28 running in the circumferential direction that are arranged in the axial direction spaced apart from each other. The circumferential supports 28 are connected to each other via axial supports 30, which run in the axial direction. The axial supports 30 are arranged in a circumferentially distributed manner. The heating cage 22 has the same overall axial elongation as the filter bellows 12, so that the filter bellows 12 is arranged nearly completely within the heating cage 22. The heating foil 26 rests against the radially inner circumferential side of the cage frame 24. The heating foil 26 rests with its radially inside circumferential side against the radially outer side circumferential side, which is to say radially outside fold edges, of the filter bellows 12. The cage frame 24 supports the heating foil 26. Moreover, the cage frame 24 supports the filter bellows 12 indirectly via the heating foil 26 and thus stabilizes the filter element 10 overall.

In FIGS. 1 and 3 to 5 top, a round connecting end plate 32 is arranged on a front side of the filter bellows 12, which faces an outlet connection of the filter housing for filtered fuel when the filter element 10 is installed. The connecting end plate 32 is made of plastic. The connecting end plate 32 is adhered tightly to the filter bellows 12. The connecting end plate 32 has a central outlet opening 34 for the filtered fuel. A radially outside diameter of the connecting end plate 32 corresponds approximately to the radially inside diameter of the cage frame 24.

The connection opening 34 is enclosed on the outer side of the connecting end plate 32 opposite the filter bellows 12 in the axial direction by two coaxial, annular ring projections that extend parallel to each other in the axial direction. The ring projections form a seal holder 36 for a ring seal 38. The seal holder 36 has a U-shaped profile that is open on the side facing away from the filter bellows 12.

In FIGS. 1 and 3 to 5 bottom, a counter end plate 40 is arranged on the front side of the filter bellows 12 opposite the connecting end plate 32 that is also tightly adhered to the filter bellows 12 and connected by means of an appropriate locking connection to the middle supporting pipe 20.

The heating foil 26 is flat and rectangular in its original shape. The heating foil 26 has a plurality of flow holes 42 that are distributed circumferentially with respect to the heating cage 22. The flow holes 42 have a round cross section, for example. However, they can also have another kind of cross section. In a second exemplary embodiment explained further below in connection with FIGS. 6 and 7, for example, the flow holes 42 have a rectangular cross section.

On a circumferential side in the region of an axially outer circumferential support 28 of the cage frame 24 facing toward the connecting end plate 32, the heating foil 26 has two electrical contact tabs 44 with which the heating foil 26 can be electrically contacted, i.e., supplied with an electrical current. The two contact tabs 44 lie next to each other when seen in the circumferential direction and are provided in the figures with only one reference symbol 44 for the sake of clarity. The contact tabs 44 consist of sections of the heating foil 26 that can be bent radially outward by means of appropriate axial recesses on the front side of the heating foil 26.

In the region of the contact tabs 44, the axially outer circumferential support 28 facing toward the connecting end plate 32 has an indentation 45. The indentation 45 has an approximately U-shaped profile when seen from radially outside, whereas the "U" is open toward the connecting end plate 32.

On the side of a circumferentially extending section of the indentation 45 facing toward the connecting end plate 32, a living hinge 46 is integrally connected to the circumferential support 28. When seen in the radial direction, the living hinge 46 is located approximately in the middle of the indentation 45. On the side facing away from the circumferential support 28, the living hinge 46 has an attachment tab 48. The attachment tab 48 can be swiveled by means of the living hinge 46 from a preassembly position, shown in FIGS. 1 to 3, in which it extends radially outward from the cage frame 24, to a final assembly position, shown in FIGS. 4 and 5, in which it extends in the axial direction. Together, the living hinge 46 and the attachment tab 48 form a swivel connection 50 that connects an electrical connecting plug 52 to the cage frame 24.

The connecting plug 52, which is shown in a detailed section in FIG. 2, has a plug housing 54 made of plastic in which the two contact lines made of metal are embedded. On the connection side of the connecting plug 52, the contact lines are embodied as contact pins 56. The contact pins 56 turn into corresponding connecting tabs 58 that lead laterally out of the plug housing 54. Each of the connecting tabs 58 is connected at its free end by means of rivets 60 to the attachment tab 48. The contact tabs 44 of the heating foil 26 are arranged on the side of the connecting tabs 58 opposite the attachment tab 48. Each of the contact tabs 44 is electrically connected to one of the connecting tabs 58. The rivets 60 lead through the contact tabs 44, the connecting tabs 58 and the attachment tab 48. The connecting tabs 58 are thus sandwiched between the attachment tab 48 and the contact tabs 44. The connecting plug 52 is held on the attachment tab 48 with the aid of the connecting tabs 58 and held in a swiveling manner on the cage frame 24 by means of the living hinge 46.

An underside 62 of the plug housing 54 facing toward the cage frame 24 is level. The underside 62 of the plug housing 54 runs perpendicular to the longitudinal extension of the attachment tab 48, the contact tabs 44 there and the connecting tabs 58 there. The attachment tab 48, the connecting tabs 58 and the contact tabs 44 are located laterally from the underside 62 of the plug housing 54 and, in a projection perpendicularly onto the underside 62, outside of same. In the preassembly position, the plug housing 54 is located on the side of the attachment tab 48, the contact tabs 44 and the connecting tabs 58 facing toward the connecting end plate 32. In the final assembly position, the attachment tab 48, the contact tabs 44 and the connecting tabs 58 dip into the indentation 45 of the axially outer circumferential support 28 and are thus housed in a space-saving manner when seen in the radial direction.

The underside 62 of the plug housing 54 has an approximately rectangular circumference with rounded-off corners. On the side facing away from the connecting tabs 58, the plug housing 54 has a projection 64 whose underside forms a plane with the underside 62. The projection 64 extends between the rounded-off edges of the plug housing 54 on the side opposite the connecting tabs 58. On the two opposing sides that adjoin the side with the projection 64, the plug housing 54 has two positioning lugs 66 that extend outwardly from the outer side of the plug housing 54. Moreover, a positioning recess 68 that is approximately cross-shaped in cross section is arranged in the underside 62 as shown in FIG. 2. The positioning recess 68 is located approximately in the center of the underside 62.

On its outer side facing away from the filter bellows 12, the connecting end plate 32 has a holding contour 70 for the underside 62 of the plug housing 54. The holding contour 70 is located near the circumferential side of the connecting end plate 32 facing toward the connecting plug 52. It comprises a rib extending in the axial direction from the outer side of the connecting end plate 32. The rib has a profile with multiple bends. The rib is symmetrical to a radius of the connecting end plate 32. The profile of the rib of the holding contour 70 corresponds to the profile of the outer side of the plug housing 54 with the projection 64 in the region of the underside 62. The holding contour 70 is open radially outward on its side facing toward the connecting plug 52 in the preassembly position. A positioning cross 72 in the form of a projection extending in the axial direction is located in the center of the holding contour 70 and fits into the positioning recess 68 of the plug housing 54.

In radial extension to the positioning cross 72, a plate-side positioning nose 74 is arranged on the radially outer circumferential side of the connecting end plate 32 and extends radially outward. In the final assembly position of the connecting plug 52, the plug housing 54 is located with its underside 62 and its projection 64 within the holding contour 70 of the connecting end plate 32. The positioning lugs 66 of the plug housing 54 all rest against a free end of the holding contour 70. The positioning cross 72 is dipped into the positioning recess 68 of the plug housing 54. The plate-side positioning nose 74 protrudes between the connecting tabs 58 of the connecting plug 52.

A respective detent element 76 is located on sides outside of the holding contour 70 that are opposing when seen in the circumferential direction. The detent elements 76 extend from the outer side of the connecting plate 32 in the axial direction. Detent lugs of the detent elements 76 are located on the outer side facing away from the respective other detent element 76. The detent elements 76 are located approximately on a plane with the positioning cross 72, which runs perpendicular to a radius of the filter element 10.

Moreover, a positioning aid 78 in the form of a projection is arranged radially on the outside on the side of the seal holder 36 transversely opposite the holding contour 70. The positioning aid 78 extends in the radial direction from the radially outer circumferential side of the radially outer ring projection, which delimits the seal holder 36, and in the axial direction from the outer side of the connecting end plate 32.

A fixing element 80 is plugged onto the outer side of the connecting end plate 32. The fixing element 80 has an approximately annular seal fixing section 82 and a fork-like plug fixing element 84. The seal fixing section 82 is arranged coaxially on the seal holder 36. The plug fixing element 84 extends radially outward from the seal fixing section 82.

The seal fixing section 82 has an approximately U-shaped profile. It is plugged with its open side onto the ring projections of the seal holder 36 of the connecting end plate 32, so that the side walls of the seal fixing section 82 enclose the ring projections of the seal holder 36. On a radially outer circumferential side, the seal fixing section 82 has a fixing groove 86 into which the positioning aid 78 of the connecting end plate 32 engages when the fixing element 80 is mounted. Furthermore, the seal fixing section 82 has on its side facing away from the connecting end plate 32 a plurality of through-slits 88 through which air can escape upon plugging-on of the fixing element 80.

The profile of the plug fixing element 84 on its U-shaped inner side corresponds approximately to the profile of the outer side of the plug housing 54 outside of the projection 64. When the fixing element 80 is mounted, the plug fixing element 84 encloses the plug housing 54 on the side of the projection 64 facing away from the connecting end plate 32. The plug fixing element 84 has a locking slot 90 on each of its legs in which the detent elements 76 of the connecting end plate 32 respectively lock when the fixing element 80 is mounted.

The fixing element 80 fixes both the plug housing 62 to the connecting end plate 32 and the ring seal 38 and an annular disc 92 in the seal holder 36. The annular disc 92 is arranged between the ring seal 38 and the seal fixing section 82.

During operation of the fuel filter, the fuel flows through the filter element 10 from radially outside to radially inside, indicated in FIG. 5 by an arrow 93. When it passes through the heating foil 26, the fuel is heated before it reaches the filter medium 14. The cleaned fuel exits the interior space 18 through the outlet opening 34 in the connecting end plate 32, indicated in FIG. 5 by an arrow 95.

In a method for manufacturing the filter element 10, the filter bellows 12 is folded in a star-shape out of the filter medium 14. The cage frame 24 with the swivel connection 50 is fabricated out of plastic.

The prefabricated heating foil 26 is arranged on the radially inner circumferential side of the cage frame 24 such that the contact tabs 44 point radially outward through the indentation 45 of the axially outer circumferential support 28. The prefabricated connecting plug 52 is connected with its connecting tabs 58 by means of the rivets 60 to the attachment tab 48 and the contact tabs 44. As shown in FIGS. 1 to 3, in the preassembly position, the connecting plug 52 is located circumferentially and radially on the outside of the cage frame 24.

The filter bellows 12 is pushed into the heating cage 22 in the axial direction. The middle supporting pipe 20 is plugged in the axial direction into interior space 18 of the filter bellows 12. Alternatively, the middle supporting pipe 20 is first plugged into the interior space 18 of the filter bellows 12 and then pushed together with the filter bellows 12 into the heating cage 22.

The connecting end plate 32 and the counter end plate 40 are then arranged on the corresponding front sides of the filter bellows 12. The connecting end plate 32 is aligned such that the positioning nose 74, when seen in the circumferential direction, is located approximately in the middle of the indentation 45 of the axially outer circumferential support 28. The connecting end plate 32 and the counter end plate 40 are tightly adhered to the front sides of the filter bellows 12 in a manner that is of no further interest.

The connecting plug 52 is then swiveled by means of the swivel connection 50 to the axial outer side of the connecting end plate 32. In doing so, the plug housing 54 is guided with the projection 64 on the underside 62 in the holding contour 70. In the final assembly position, the positioning lugs 66 rest against the holding contour 70 and the positioning cross 72 engages in the positioning recess 68 of the plug housing 54. FIG. 4 shows the filter element 10 following this method step.

The ring seal 38 and the annular disc 92 are then placed into the seal holder 36. The fixing element 80 is placed in the axial direction with its open side first onto the seal holder 36. In doing so, the fixing element 80 is aligned such that the positioning aid 78 engages in the fixing groove 86 of the seal fixing sections 82 and the plug fixing element 84 encloses the plug housing 54. The detent elements 76 protrude into the locking slots 90 and lock with them in the end position of the fixing element 80. The completely assembled filter element 10 is shown in FIG. 5. The filter element 10 can now be installed in the filter housing.

FIGS. 6 and 7 show a second exemplary embodiment of a filter element 110 in two different manufacturing phases. Those elements that are similar to those of the first exemplary embodiment from FIGS. 1 to 5 are designated with the same reference symbols plus 100. Unlike in the first exemplary embodiment, a seal fixing element 182 for fixing the ring seal is embodied as a separate component distinct from a plug fixing device 184 for fixing the connecting plug 152. The seal fixing element 182 comprises an annular disc with a U-shaped profile with the through-slits 88 and the fixing groove 86. The plug fixing device 184 comprises two detent elements 185 that extend in the axial direction from the outer side of the connecting end plate 132. Detent lugs of the detent elements 185 are facing each other. Each of the sides of the plug housing 154 corresponding to the detent elements 185 has a grading that serves as locking receptacles 187 for the detent lugs of the detent elements 185. The detent elements 185 additionally have the function, together with the positioning cross 72 and the positioning recess 68, of positioning the plug housing 154 on the connecting end plate 132.

In the method for manufacturing the fixing element 110, analogously to the procedure with the filter element 10 according to the first exemplary embodiment, the filter bellows, which is covered in FIGS. 6 and 7, is first arranged in the heating cage 22. The connecting end plate 132 and the counter end plate 140 are then attached to the filter bellows. Subsequently, the ring seal and the annular disc 92 are arranged in the seal holder 136, and the seal fixing element 182 is attached to the connecting end plate 132. FIG. 6 shows the filter element 110 following this manufacturing phase. Finally, the plug housing 154 is swiveled by means of the swivel connection 50 to the connecting end plate 132 and fixed with the detent elements 154 and the locking receptacles 187 in its front-side final assembly position. The completed filter element 110 is shown in FIG. 7.

In all of the above-described exemplary embodiments of a filter element 10; 110 and of a method for manufacturing it, the following modifications are possible, among others:

The invention is not limited to a filter element 10; 110 of a fuel filter of a combustion engine of an automobile. Rather, it can also be used in other types of filter for fluids, for example for oil, water, air or urea. Instead of for Diesel fuel, the fuel filter can also be used for other types of fuel, such as liquid ones. The invention can also be used outside of automobile technology, for example in industrial motors. It can also be used outside of combustion engines.

Instead of a round cross section, the filter element 10; 110 can also have a different cross section, such as an oval or angular cross section. Instead of a cylindrical shape, the filter element 10; 110 can also have a different shape, such as a conical shape.

Instead of being folded in a star shape or bent, the filter medium 14 can also not be folded, for example wound as a so-called wound filter.

Instead of through adhesion, the connecting end plate 32; 132 and/or the counter end plate 40 can also be connected to the filter bellows 12 in another manner, for example by means of welding.

Instead of the heating foil 26, another type of flat, electrically operated heating medium such as a heating fabric or a nonwoven heating medium, for example, can also be used.

Instead of with the aid of rivets 60, the connecting tabs 58 of the connecting plug 52; 152 can also be connected in another manner to the attachment tab 48 of the swivel connection 50. For example, they can be attached by means of soldering, clamping or by means of another type of stable and electrically conductive connection.

Instead of with the detent elements 76; 185 and the corresponding positioning lugs 66 or locking receptacles 187, the connecting plug 52; 152 can also be fixed positively or non-positively or by material engagement in its final assembly position in another manner, such as by means of adhesion, screwing or welding, for example.

Instead of plastic, the connecting end plate 32; 132 and/or the counter end plate 40 and/or the middle supporting pipe 20 and/or the plug housing 54; 154 and/or the cage frame 24; 224 and/or the fixing element 80 and/or the seal fixing element 182 can also be made of another type of material, such as metal, for example.

Instead of having approximately the same overall elongation as the filter bellows 12, the heating cage 22 can also extend only partially axially, which is to say over a portion of the axial extension of the filter bellows 12. Advantageously, a front side of the heating cage 22 can rest against the connecting end plate 32; 132, so that a short, electrical connection to the connecting plug 52; 152 can easily be implemented there. Alternatively, both of the front sides of the heating cage 22 can also each be arranged at an axial distance from the connecting end plate 32; 132 and from the counter end plate 40.

Instead of being pivoted by means of the living hinge 46 and the attachment tab 48 to the cage frame 24, the connecting plug 52 can also be connected in a swiveling manner to the heating foil 26 merely via the contact tabs 44. For this purpose, the contact tabs 44 can be appropriately stable and flexible. In an alternative embodiment of a heating cage, the cage frame can then also be omitted.

The invention claimed is:

1. A filter element of a filter for fluid, comprising:
a filter medium closed circumferentially at least with respect to a central element axis and structured as a filter medium hollow body having an elongated hollow center elongated on the central element axis;
at least one end member arranged on at least one front side of the filter medium hollow body, the at least one end member tightly connected at least to the filter medium;
an electrical heating jacket into which the filter medium hollow body is inserted, the electrical heating jacket arranged on a radial outer face of the filter medium and enclosing at least partially circumferentially and at least partially axially the filter medium, wherein the heating jacket is electrically connected to an electrical connecting element that can be connected to electrical lines to supply electrical power to the electrical heating jacket;
wherein the electrical connecting element is attached to the heating jacket by means of which the connecting element can be swiveled during assembly of the filter element from a preassembly position circumferentially outside of the filter element into a final assembly position on a top side of said at least one end member of the filter element;
wherein the front side of the filter medium hollow body is provided with the at least one end member after insertion of the filter medium hollow body into the heating jacket.

2. The filter element as set forth in claim 1, wherein
a fluid-permeable supporting hollow body encloses at least the filter medium hollow body circumferentially and at least partially axially; and
wherein and the electrical connecting element is attached by means of the swivel connection to the supporting hollow body.

3. The filter element as set forth in claim 2, wherein
the heating jacket is arranged between a circumferential side of the filter medium hollow body and a circumferential side of the supporting hollow body.

4. The filter element as set forth in claim 1, wherein
the at least one end member includes a holding device positioning or holding the electrical connecting element.

5. The filter element as set forth in claim 1, comprising
a fixing element is connected to the at least one end member, the fixing element having
a connecting element fixing section that fixes the electrical connecting element to the end member; and
a seal fixing section that fixes a seal around an opening of the end member.

6. A method for manufacturing a filter element as set forth in claim 1, comprising:
providing filter medium is structured into a filter medium hollow body that is circumferentially enclosed at least with respect to an element axis and having a first front side;
inserting the filter medium hollow body into an electrical heating jacket with the first front side first so that the heating jacket is arranged at least partially circumferentially and at least partially axially around the filter medium hollow body;
arranging a sealing end member on the first front side of the filter medium hollow body.

7. The method for manufacturing a filter element as set forth in claim 6, comprising
attaching an electrical connecting element to the heating jacket by means of a swivel connection;

wherein after the inserting step, the method includes
swiveling the swivel connection from a preassembly position into a final assembly position on the front side of the filter medium hollow body.

8. The method as set forth in claim 7, comprising:

providing a fluid-permeable supporting hollow body;

enclosing a radial outer circumference of the filter medium hollow body circumferentially and at least partially axially;

wherein the electrical connecting element is attached by means of the swivel connection to the fluid-permeable supporting hollow body.

9. The method as set forth in claim 8, wherein the heating jacket is arranged on an inner circumferential side of the supporting hollow body.

10. The method as set forth in claim 6, wherein the at least one end member includes a holding device positioning or holding the electrical connecting element;

wherein the electrical connecting element is swiveled against, in and on the holding device of the at least one end member.

11. The method as set forth in claim 10, wherein providing a fixing element connected to the at least one end member, the fixing element having a connecting element fixing section that fixes the electrical connecting element to the end member; and a seal fixing section that fixes a seal around an opening of the end member;

fixing the electrical connecting element onto the end member with by the connecting element fixing section; and mounting the seal around an opening of the end member with the seal fixing section.

\* \* \* \* \*